July 14, 1931.  C. E. FINNEY  1,814,469
EARTHWORKING IMPLEMENT
Filed June 26, 1930  2 Sheets-Sheet 1
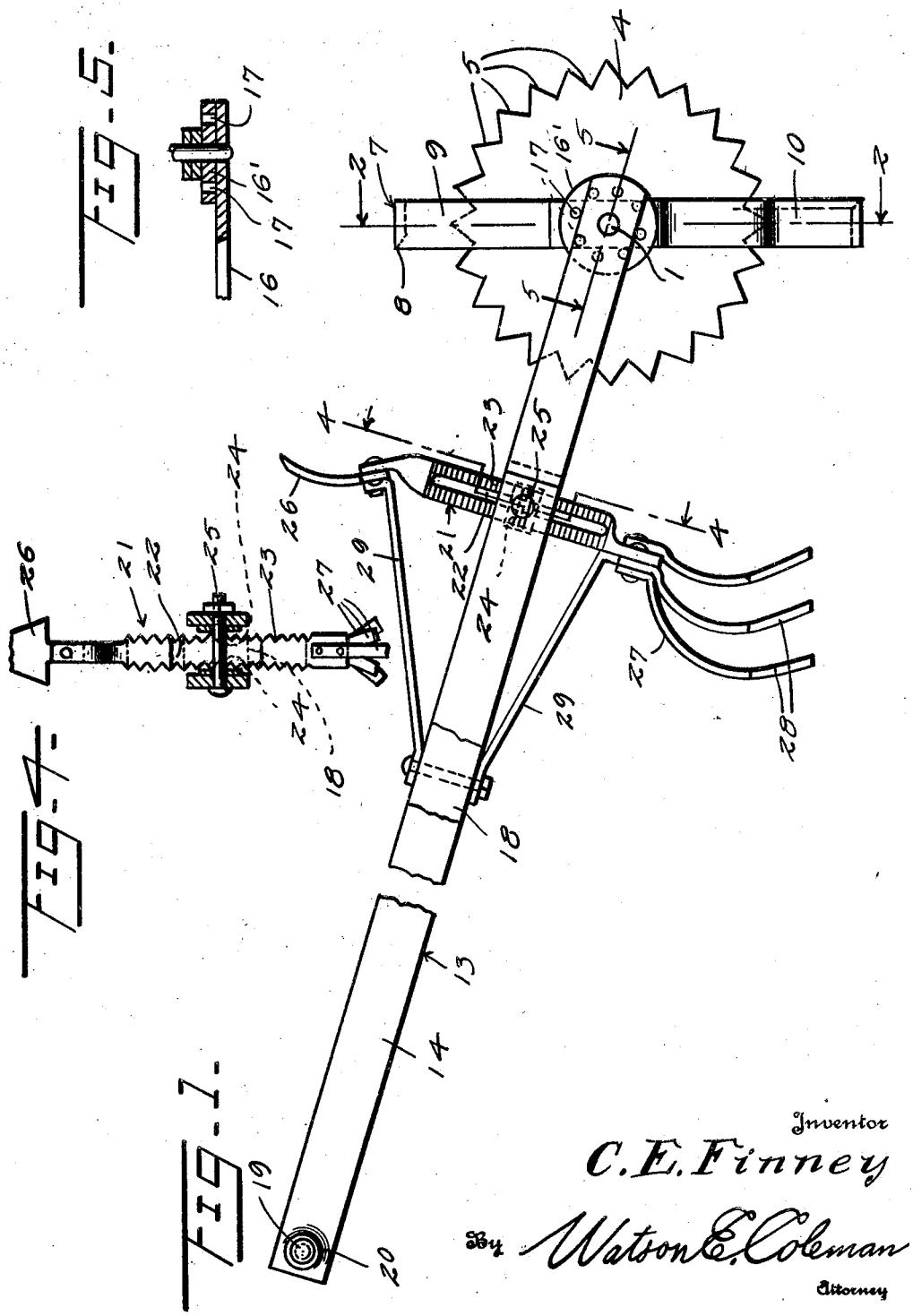
Inventor
C.E.Finney
By Watson E. Coleman
Attorney July 14, 1931.   C. E. FINNEY   1,814,469
EARTHWORKING IMPLEMENT
Filed June 26, 1930   2 Sheets-Sheet 2
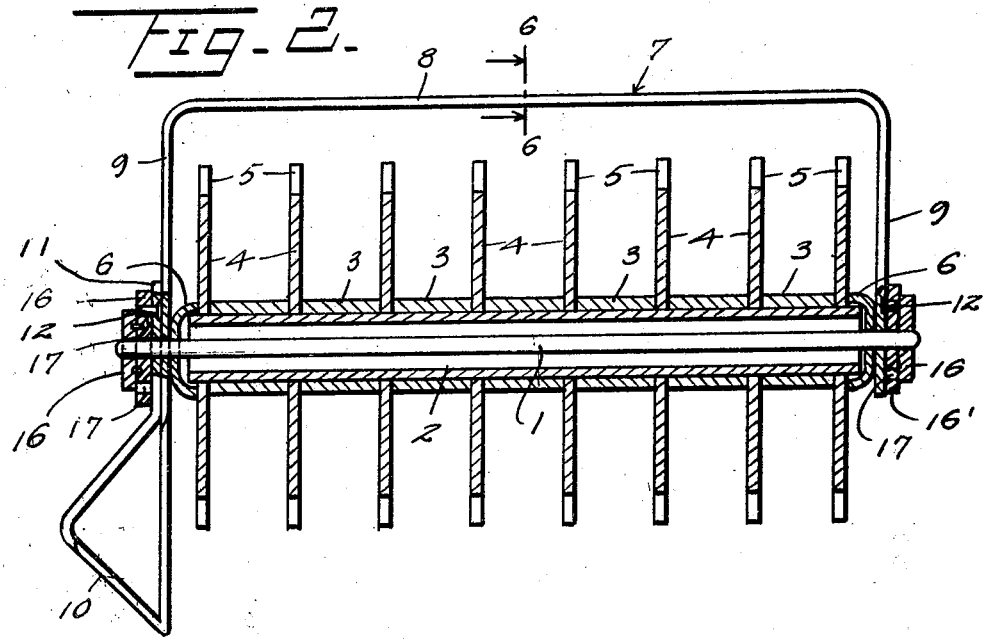
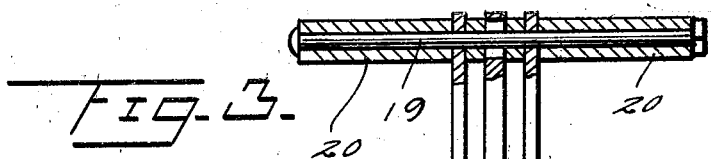
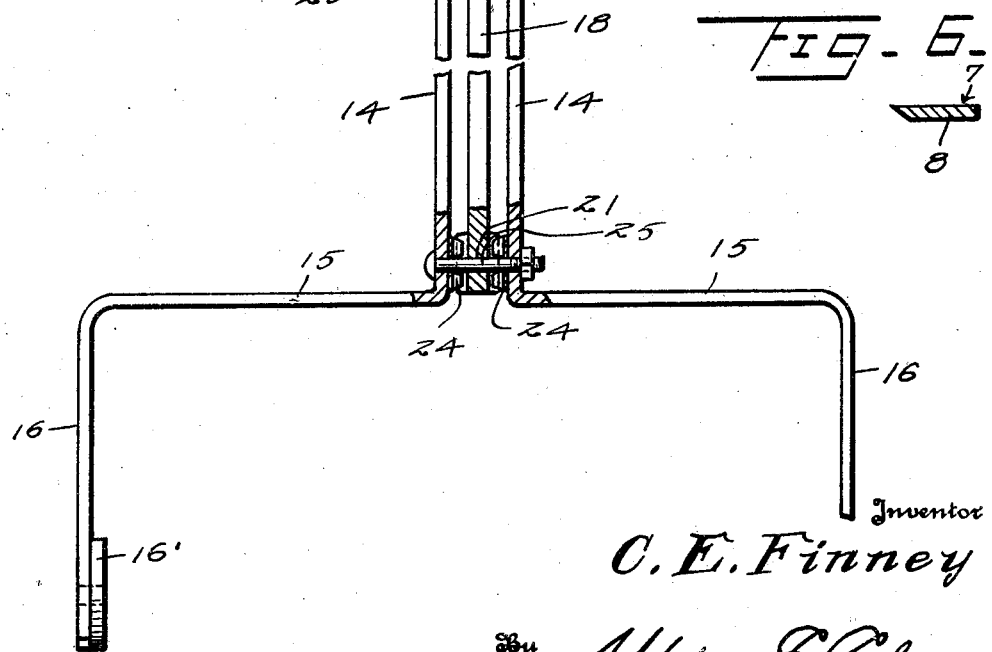
Inventor
C. E. Finney
By Watson E. Coleman
Attorney Patented July 14, 1931

1,814,469

UNITED STATES PATENT OFFICE

CLARENCE ELY FINNEY, OF HUNTINGTON, INDIANA

EARTHWORKING IMPLEMENT

Application filed June 26, 1930. Serial No. 464,023.

This invention relates to improvements in earth working implements and pertains particularly to a cultivator and weeder.

The primary object of the present invention is to provide a hand operated device which may be employed for cutting up the earth around flowers or in other small enclosed areas and for cutting away at the same time any grass or weeds which may be growing in the area.

Another object of the invention is to provide a device which will cut into and work up the ground in flower beds and which has associated therewith a device for cutting into the earth along the edge of the bed to free the same of weeds and restore a straight border line thereto.

A still further object of the invention is to provide an earth working implement having a plurality of spaced rotatably mounted wheels designed to cut into the earth, and having associated therewith a plowing element designed to follow the wheels or rotary blades to break up the ground over which the blades pass, the blades in addition to cutting into the surface of the ground acting as a stable support for the structure.

The invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claims.

In the drawings:

Figure 1 is a view in side elevation of the implement embodying the present invention.

Figure 2 is a sectional view taken upon the line 2—2 of Figure 1.

Figure 3 is a view in top plan of the handle structure and the plow carrying bar, parts being shown in section.

Figure 4 is a sectional view taken on the line 4—4 of Figure 1.

Figure 5 is a sectional view taken on the line 5—5 of Figure 1.

Figure 6 is a sectional view taken on the line 6—6 of Figure 2.

Referring more particularly to the drawings wherein like numerals of reference indicate corresponding parts throughout the several views, the cultivator embodying the present invention comprises an axle shaft 1 which supports the earth working elements of the device. This shaft is surrounded by a sleeve 2 which is of slightly less length than the shaft and in the assembled structure the ends of the shaft project beyond the ends of the sleeve as shown. Mounted on the sleeve 2 is a plurality of collars 3 between which are placed the disks 4 which have their edges formed to provide teeth 5. Each end of the sleeve 2 has a cap 6 thereover through which the shaft 1 passes. Each of these caps maintains a disk 5 in position, as shown, so that all of the disks and the collars 3 are secured together by the caps upon the ends of the sleeve 2.

Mounted upon the shaft 1 is a substantially U-shaped frame which is indicated as a whole by the numeral 7. This frame comprises the elongated cross portion 8 which has one longitudinal edge sharpened, as shown, and the side portions or legs 9 through each of which one end of the shaft 1 passes. One of the legs 9 is extended and turned back upon itself to form a substantially triangular cutter 10, one angle of which projects beyond the edges of the disks 5 as shown.

This leg which is turned back to form the triangular cutter 10 has its end secured against the outer side as indicated at 11 and as shown this end has the shaft 1 extended therethrough.

Each of the legs 9 of the frame 7 carries at a point adjacent the shaft 1 an outwardly projecting pin 12. The device is controlled by means of a handle structure which is indicated as a whole by the numeral 13. This handle is made up of a pair of elongated flat bars each of which is indicated by the numeral 14, each of which bars at its lower end is turned laterally as indicated at 15 and terminates in a forwardly directed portion 16 which is in spaced parallel relation to the main portion of the bar as shown. Upon the inner face of each of the portions 16 of the handle bars there is secured a centrally apertured circular plate 16′ which receives the adjacent end of the shaft 1 and this plate has formed therein concentrically about the aperture through which the shaft 1 passes, a series of apertures 17 in one of which the pin 12 carried by the adjacent frame leg 9 is adapted to engage.

The bars 14 of the handle have disposed therebetween and extended longitudinally thereof an oscillatable bar 18. The outer end of the bar 18 is substantially in alignment with the outer ends of the bars 14 and there extends through all of these bars at their outer ends a relatively long bolt 19 which carries at each side of the handle structure a sleeve 20 which forms a transversely extending hand grip for the handle bar.

The central or oscillatable bar 18 has its forward end terminating between the bars 14 at the points where the lateral extensions 15 project from these bars and there is carried by this bar at the inner end the vertically disposed plate 21 through which is formed a longitudinally extending slot 22 and in each face of which is formed a series of transverse teeth 23. The bars 14 have positioned against their inner faces adjacent the plate 21 the toothed apertured plates 24 and each of these bars at this point is apertured to receive a transverse bolt 25 which passes through the plates and the slot 22 of the plate 21. The bars 14 are thus drawn together so that the teeth of the plates carried thereby will firmly engage between certain of the teeth carried by the plate and the plate will thus be held in fixed position. It will, of course, be readily seen that by loosening the bolt 25 vertical adjustment of the plate 21 may be made.

At one end of the plate 21 there is secured a plow blade 26 while at the opposite end there is secured a number of arms 27 each of which carries a small plow blade 28, the group of blades 28 covering a relatively large area.

The upper and lower ends of the plate 21 are connected by brace rods 29 with the bar 18 in the manner shown so that the plate will be held rigidly and will not become easily broken as a result of the strains to which it may be subjected, when the device is in use.

When in use, as for example in working up the earth at flower beds, the ends 16 of the handle 13 may be drawn into position against the sides 9 of the frame 7 with the frame so disposed that the triangular blade 10 will be directed downwardly.

With the elements assembled in this manner the cutting disks may be run over the surface of the ground to break up the same and the sharpened edge of the triangular cutter 10 forced into the ground and run along the border of the flower bed so as to cut away overhanging grass and weeds and thus trim up the same. After the trimming operation the frame 7 may be swung around, after, of course, loosening and spreading apart the portions 16 of the bars of the handle, until the transverse weed cutting blade is brought down into position against the ground. After resecuring the handle the device may be worked back and forth over the surface of the bed and and the blade 8 will cut away all grass and weeds while the disks 5 work into and cut up the surface.

It will, of course, be obvious that by vertically adjusting the plate 21 either the group of plows 28 or the single plow 26, whichever happens to be in the downwardly directed position, may be arranged as desired for plowing up the earth. Reversal of the plate 21 when desired may be made by removing the bolt 19 which holds the outer ends of the handle bars 14 and the bar 18 in assembled relation.

From the foregoing description it will be readily seen that a number of different operations may be readily performed with the implement embodying the present invention, such for example as mulching, cutting weeds in the flower bed, trimming up the edges of the flower bed or the edges of a walk and plowing.

In addition to the foregoing the weeder bar may be employed as a sod cutter by bearing down upon the handle sufficiently to force the sharpened edge of the bar 8 along beneath the sod.

Having thus described my invention, what I claim is:

1. An implement of the character described, comprising a shaft, a plurality of disks mounted on said shaft, a handle having pivotal connection with each end of said shaft, a substantially U-shaped fame having each side portion pivotally connected adjacent its free end with one end of said shaft and having the portion intermediate the side portions formed to provide a cutting blade, and a connection between said handle and the side portions of said U-shaped frame normally securing the same against independent oscillation and separable to facilitate the oscillation of the frame to shift the same to an adjusted position.

2. An implement of the character described, comprising an axle, rotating ground engaging elements mounted on said axle, a handle comprising a pair of elongated flat bars disposed in spaced parallel relation, and offset members, each connected with one end of a bar and having connection with the axle, the other ends of said bars having a connecting element therebetween, a bar member disposed between said flat bars and oscillatably supported at one end by said connecting element, said last mentioned bar terminating adjacent the other ends of the parallel bars, a vertically disposed plate carried by said last mentioned bar, an earth working element carried by said plate, means for establishing a non-slipping connection between the last mentioned bar and the adjacent parallel bars, and means for drawing said parallel bars together against the plate interposed therebetween.

3. An earth working implement, comprising an elongated handle formed of a pair of members designed to be separated laterally, a hand grip at one end of the handle, a shaft, means at the other end of the handle connecting each of the members with an end of the shaft, ground engaging elements rotatably mounted on the shaft, an elongated element disposed between said members and connected at one end with and vertically oscillatable on the hand grip, an earth working element carried by said elongated element at its other end, and means for securing the elements in an adjusted working position.

4. An earth working implement, comprising an elongated handle formed of two independent bar members arranged in side by side relation, a hand grip extending transversely of the handle and connecting the bar members at one end, a shaft, a ground engaging element rotatably carried by said shaft and between the other ends of said members, a tooth positioned upon each of the opposed faces of said bar members at a point inwardly of their said other ends, a connecting element between the bar members adjacent said teeth, said bar members being adapted for relative lateral movement at their said other ends, a central bar disposed between the first mentioned bar members and having one end connected with said hand grip for oscillation thereon, and an earth working element carried by said central bar at its other end and adapted to be gripped between said teeth to be held in an adjusted position thereby.

5. An earth working implement, comprising a handle formed of a pair of bar members disposed in spaced side by side relation, a hand grip connecting said members at one end and extending transversely thereof, a ground engaging member rotatably supported between the bar members at their other ends, means for connecting said bar members together intermediate their ends, said means being releasable to permit of the relative lateral adjustment of the bar members, a central bar member disposed longitudinally between the handle bar members and having one end connected with said hand grip to permit of its vertical oscillation thereon, an elongated member carried by and extending transversely of the other end of the central bar member and having a longitudinal slot therein for the passage of said connecting means, and an earth working element carried by said elongated member, said connecting means acting to draw said handle bar members together against the slotted member.

6. An earth working implement, comprising a handle formed of a pair of bar members disposed in spaced side by side relation, a hand grip connecting said members at one end and extending transversely thereof, a ground engaging member rotatably supported between the bar members at their other ends, means for connecting said bar members together intermediate their ends, said means being releasable to permit of the relative lateral adjustment of the bar members, a central bar member disposed longitudinally between the handle bar members and having one end connected with said hand grip to permit of its vertical oscillation thereon, an elongated member carried by and extending transversely of the other end of the central bar member and having a longitudinal slot therein for the passage of said connecting means, an earth working element carried by said elongated member, said connecting means acting to draw said handle bar members together against the slotted member, said slotted member having a plurality of transverse teeth in each side face, and teeth upon the opposed faces of the handle bar members designed to engage between adjacent teeth of the slotted member.

7. An earth working implement, comprising an elongated handle body formed to provide two portions having a longitudinally extending recess therebetween, a hand grip extending transversely of the handle at one end, means extending transversely of the handle intermediate its ends designed to reduce the width of said recess, a ground engaging member rotatably carried by the handle at its forward end, a bar member disposed in and extending longitudinally of said recess and mounted at the end adjacent the hand grip for vertical oscillatory movement, said bar member at the other end having a transverse plate, and an earth working element carried by said transverse plate, said bar being held in an adjusted position in said recess by reducing the width thereof by the said means to grip the transverse plate between the sides of the recess.

8. An earth working implement, comprising an elongated handle member formed of a pair of bars disposed in spaced side by side relation and including laterally and forwardly extending arms each being integral with a bar at its forward end, a hand grip extending transversely of and connecting said bars at the other ends, a connecting member between said bars adjacent said lateral arms, a plate formed at the free end of each of said forwardly extending arms and having a central aperture and an annular series of apertures disposed thereabout, a shaft connecting said forwardly extending arms and mounted at its ends in said central apertures, ground engaging members rotatably mounted on said shaft, a substantially U-shaped member having each side portion adjacent the free end traversed by said shaft, a pin carried by each side portion of the U-shaped member and projecting outwardly therefrom, said pins being designed for selective engagement in said annular series of apertures to maintain the central portion of the U-shaped member in a predetermined position relative to the handle, an elongated member disposed transversely of and between the bar members of said handle, and an earth working element carried by said elongated member, said last member being gripped and held between the bar members by the drawing of the same together by the connecting member therebetween.

9. An implement of the character described, comprising a shaft, an elongated sleeve surrounding said shaft and having the ends of the shaft projecting therefrom, a plurality of disks mounted upon said sleeve, a plurality of collars surrounding the sleeve, each of said collars separating a pair of disks, a pair of caps each receiving an end of said sleeve and maintaining an adjacent disk in position, each cap having an end of the shaft mounted therein, each of said disks having a toothed periphery for penetration into the ground, a handle, including laterally spaced members each connected with an end of said shaft, a weeder comprising an elongated bar having one edge sharpened and having laterally directed end portions pivotaly mounted upon said shaft between the ends of the sleeve and the adjacent laterally spaced members of the handle, and means for securing said end portions to said laterally spaced members of the handle.

10. An implement of the character described, comprising a shaft, an elongated sleeve surrounding said shaft and having the ends of the shaft projecting therefrom, a plurality of disks mounted upon said sleeve, a plurality of collars surrounding the sleeve, each thereof separating a pair of disks, a cap covering each end of said sleeve and maintaining an adjacent disk in position, each of said disks having a toothed periphery for penetration into the ground, a handle including laterally spaced members, each connected with an end of said shaft, a weeder comprising an elongated bar having one edge sharpened and having laterally directed end portions mounted upon said shaft between the ends of the sleeve and the connections of the shaft with the adjacent handle connecting means, the connection between said shaft and the handle connecting means at each end thereof being pivotal, and means for adjustably securing the lateral portions of said weeder bar to the adjacent handle whereby the weeder bar may be maintained in desired position relative to the handle.

In testimony whereof I hereunto affix my signature.

CLARENCE ELY FINNEY.